(12) United States Patent
Zeng et al.

(10) Patent No.: US 12,210,180 B2
(45) Date of Patent: Jan. 28, 2025

(54) BACKLIGHT MODULE AND DISPLAY DEVICE

(71) Applicants: MIANYANG HKC OPTOELECTRONICS TECHNOLOGY CO., LTD, Mianyang (CN); HKC CORPORATION LIMITED, Shenzhen (CN)

(72) Inventors: Zhi Zeng, Mianyang (CN); Xiaohui Yang, Mianyang (CN); Haijiang Yuan, Mianyang (CN)

(73) Assignees: MIANYANG HKC OPTOELECTRONICS TECHNOLOGY CO., LTD., Mianyang (CN); HKC CORPORATION LIMITED, Shenzhen (CN)

( * ) Notice: Subject to any disclaimer, the term of this patent is extended or adjusted under 35 U.S.C. 154(b) by 89 days.

(21) Appl. No.: 18/088,424

(22) Filed: Dec. 23, 2022

(65) Prior Publication Data

US 2023/0204844 A1    Jun. 29, 2023

(30) Foreign Application Priority Data

Dec. 29, 2021    (CN) .......................... 202111634428.8

(51) Int. Cl.
    *F21V 8/00*    (2006.01)
(52) U.S. Cl.
    CPC .......... *G02B 6/0025* (2013.01); *G02B 6/0073* (2013.01)
(58) Field of Classification Search
    CPC .............................. G02B 6/0025; G02B 6/0073
    See application file for complete search history.

(56) References Cited

U.S. PATENT DOCUMENTS

| | | | |
|---|---|---|---|
| 7,350,937 B2 * | 4/2008 | Yamamoto .............. | F21S 2/005 362/659 |
| 7,791,683 B2 * | 9/2010 | Larson .............. | G02F 1/133603 349/67 |
| 11,774,800 B1 * | 10/2023 | Hu ..................... | G02F 1/133603 362/97.1 |
| 2002/0024803 A1 * | 2/2002 | Adachi ................ | G02B 6/0076 362/240 |
| 2007/0147089 A1 * | 6/2007 | Lin ....................... | G02B 6/0078 362/616 |
| 2008/0101068 A1 * | 5/2008 | Kitamura .......... | G02F 1/133615 362/246 |
| 2009/0122227 A1 * | 5/2009 | Hong ................ | G02F 1/133611 349/64 |
| 2011/0001693 A1 * | 1/2011 | Kim .................. | G02F 1/133615 345/102 |

FOREIGN PATENT DOCUMENTS

| | | |
|---|---|---|
| CN | 209591361 U | 11/2019 |
| CN | 111445789 A | 7/2020 |
| CN | 112002217 A | 11/2020 |

\* cited by examiner

*Primary Examiner* — Leah Simone MacChiarolo

(57) ABSTRACT

A backlight module and a display device are disclosed. The backlight module includes an assembled light plate which is formed by assembling a plurality of light plates. There is a gap between every two adjacent light plates. The backlight module further includes a diffuser plate arranged at a position corresponding to the gap. The diffuser plate covers at least one row of light emitting diodes disposed on at least one of the two adjacent light plates. At least part of the light emitting diodes on the light plate are uncovered.

20 Claims, 3 Drawing Sheets

BACKLIGHT MODULE AND DISPLAY DEVICE

CROSS-REFERENCE TO RELATED APPLICATIONS

This application claims the priority and benefit of Chinese patent application 2021116344288, titled "Backlight Module and Display Device" and filed Dec. 29, 2021, with China National Intellectual Property Administration, the entire contents of which are incorporated herein by reference.

TECHNICAL FIELD

The present application relates to the field of display technology, and in particular, to a backlight module and a display device.

BACKGROUND

The description provided in this section is intended for the mere purpose of providing background information related to the present application but doesn't necessarily constitute prior art.

At present, there is a certain gap between the two adjacent light plates of a Mini LED assembled screen to provide space for thermal expansion and contraction of the light plates, resulting in problems such as dark lines at the corresponding gaps of the display device during display. One possible practice is to use a reflective sheet to cover the gap between the adjacent light plates and supplement light for the gap.

However, relying on the reflective sheet to reflect light at the gap will make the transition between the light emitted by the light plates and the light reflected by the reflective sheet unsmooth when the display panel is viewed as a whole, so that the effect of supplementing light for the gap is not very good, and the cost of the reflective sheet is high, which is not conducive to reducing the cost.

SUMMARY

It is therefore a purpose of the present application to provide a backlight module and a display device. On the basis of supplementing light at the gap, the light transition between the gap and the light plates is more uniform, and the production cost of the display device is reduced.

The application discloses a backlight module, including an assembled light plate. The assembled light plate is formed by assembling a plurality of light plates. There is a gap between the adjacent light plates. The backlight module further includes a diffuser plate, which is arranged at a position corresponding to the gap. The diffuser plate covers at least one row of light-emitting diodes on at least one of the light plates. At least part of the light emitting diodes on each light plate are uncovered.

Optionally, the diffuser plate simultaneously covers a row of the light emitting diodes on each of the two light plates on both sides of the gap that are adjacent to the gap.

Optionally, a diffusion cavity is defined at a position of the diffuser plate corresponding to the light emitting diode covered by the diffuser plate, and a safety distance is set between an inner wall of the diffusion cavity and the light emitting diode.

Optionally, the shape of the diffusion cavity is hemispherical.

Optionally, the assembled light plate further includes at least two first reflective sheets, and the first reflective sheets are each arranged on a side wall of the diffuser plate parallel to the gap.

Optionally, the distance between two adjacent light-emitting diodes in a row of light-emitting diodes covered by the diffuser plate is smaller than the distance between two adjacent light-emitting diodes in a row of light-emitting diodes on the light plate that are not covered by the diffuser plate.

Optionally, a side of the diffuser plate away from the respective light plates is a first surface, and a side adjacent to the light plate is a second surface, the first surface and the second surface are disposed opposite to each other, and the portion of the first surface corresponding to the position of the gap is recessed toward the second surface to form an arc shape.

Optionally, the assembled light plate further includes a second reflective sheet. The side of the diffuser plate away from the light plate is the first surface, and the side adjacent to the light plate is the second surface. The first surface and the second surface are disposed opposite to each other. The reflective surface of the second reflective sheet is attached to the second surface, and the second reflective sheet covers the gap.

Optionally, the light plate includes a main body portion and a support portion. The support portion is arranged on the side of the main body portion adjacent to the gap. The diffuser plate covers the gap. The side of the diffuser plate away from the gap is the first surface, and the side adjacent to the gap is the second surface. The first surface abuts with the support portion. The second surface is flush with the light-emitting surfaces of the respective light plates. The light emitting diodes covered by the diffuser plate are located between the support portion and the diffuser plate.

The present application further discloses a display device, the display device includes a display panel and the above-mentioned backlight module, the backlight module is arranged corresponding to the display panel, and the backlight module provides the display panel with a backlight.

Compared with the solution of arranging the reflective sheet at the gap, in the present application, a diffuser plate is disposed at the gap, and the diffuser plate covers at least one row of light-emitting diodes in at least one of the light plates adjacent to the gap, so that the light of the light plate is evenly distributed into the diffuser plate, and the light that is evenly distributed is softer. On the basis of supplementing light at the gap, the light transition between the gap and the light plates is more uniform. Furthermore, the manufacturing cost of the diffuser plate is lower, and the production cost is saved.

BRIEF DESCRIPTION OF DRAWINGS

The accompanying drawings, which are included to provide a further understanding of the embodiments of the present application, constitute a part of the specification, are used to illustrate the embodiments of the present application, and together with the written description, serve to explain the principles of the present application. Obviously, the drawings used in the following description merely depict some embodiments of the present application, and for those having ordinary skill in the art, other drawings can also be obtained from these drawings without investing creative effort. In the drawings.

DETAILED DESCRIPTION OF EMBODIMENTS

It should be understood that the terminology used herein, the specific structural and functional details disclosed are intended for the mere purpose of describing specific embodiments and are representative, but the present application may be embodied in many alternative forms and should not be construed as limited only the embodiments set forth herein.

The present application will be described in detail below with reference to the accompanying drawings and optional embodiments.

Embodiment 1

Figure 1:
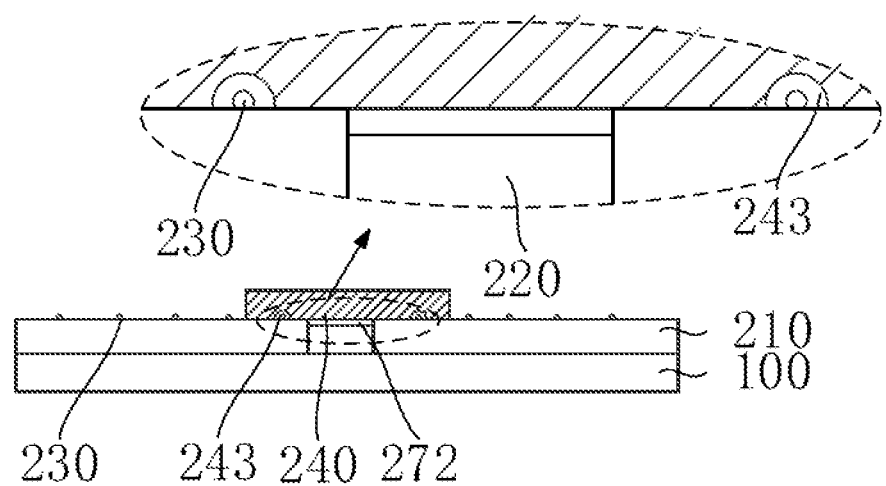
FIG. 1 is a schematic cross-sectional view of a diffuser plate disposed at a gap of an assembled light plate according to a first embodiment of the present application.

FIG. 1 is a schematic cross-sectional view of a diffuser plate disposed at the gap of an assembled light plate according to a first embodiment of the present application. As shown in FIG. 1, a backlight module 20 is disclosed. The backlight module includes an assembled light plate 200. The assembled light plate 200 is formed by assembling a plurality of light plates 210. There is a gap 220 between adjacent light plates 210. The backlight module 20 further includes a diffuser plate 240, and the diffuser plate 240 is arranged at a position corresponding to the gap 220. And the diffuser plate 240 covers at least one row of light emitting diodes 230 on at least one of the light plates 210. At least part of the light emitting diodes 230 on the light plate 210 is uncovered.

Specifically, the diffuser plate 240 may only cover the light emitting diodes 230 on the light plate 210 on one side. The diffuser plate 240 may also cover the light emitting diodes 230 on the two adjacent light plates 210 at the same time. And it can cover only one row of light-emitting diodes 230, and can also cover multiple rows of light-emitting diodes 230. This embodiment is explained by taking the diffuser plate 210 covering one row of light emitting diodes 230 that are disposed on each of the two light plates 210 on both sides of the gap 220 and that are adjacent to the gap 220 as an example.

In this embodiment, a diffuser plate 240 is disposed at the gap 220, and the diffuser plate 240 covers the respective row of light-emitting diodes 230 on each of the two adjacent light plates 210, so that the light of the light emitting diodes 230 on the two adjacent diffuser plates 240 are led into the diffuser plate 240, and then the light is supplemented at the gap 220 of the assembled light plate 200. Compared with the solution of directly disposing the reflective sheet at the gap 220, the present application uniformly distributes the light on the light plate 210 into the diffuser plate 240. From the overall view of the display panel 600, the uniform light is softer. And on the basis of supplementing light at the gap 220, the light transition between the gap 220 and the light plates 210 is more uniform. Furthermore, compared with the reflective sheet, the cost of the diffuser plate 240 is lower, which can save the production cost.

Figure 2:
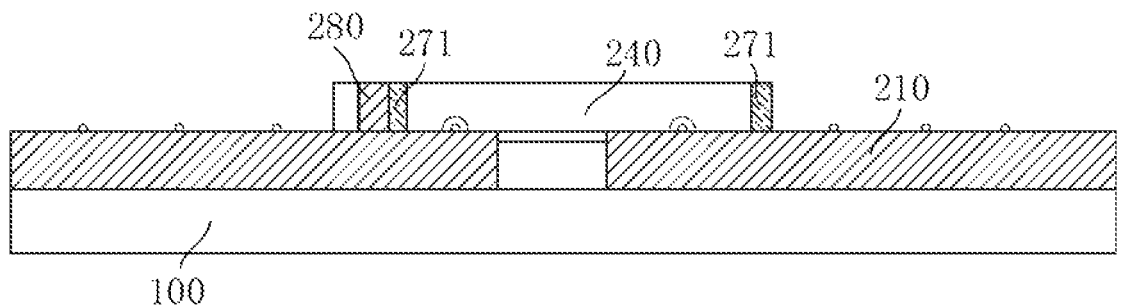
FIG. 2 is a schematic cross-sectional view of a diffuser plate disposed at a gap of a second assembled light plate according to the first embodiment of the present application.

As shown in FIG. 2, the diffuser plate 240 is fixedly connected to one of the adjacent light plates 210, and the diffuser plate 240 can move relative to the other one of the adjacent light plates 210. Since the thickness of the diffuser plate 240 is between 1.5 mm-2 mm, it is very brittle, and it is easy to break if bumped. In addition, the light plate 210 will undergo certain deformation due to thermal expansion and contraction due to the influence of the environment. Therefore, in the present application, the diffuser plate 240 is fixedly connected to one of the light plates 210, and is not connected to the other light plate 210 of the adjacent light plates 210. When the light plate 210 is deformed, the light plate 210 and the diffuser plate 240 are equivalent to be connected with a floating connection, so that he stress caused by the deformation of the light plates 210 can be prevented from being applied to the diffuser plate 240 causing damage to the diffuser plate 240.

Specifically, a through hole can be provided in the diffuser plate 240, and the support column 280 on the light plate 210 can be moved to a position corresponding to the through hole for fixed connection. Compared with direct glue sticking, it is easier to install, does not require positioning, and is convenient for later disassembly.

In addition, the thickness of the diffuser plate 240 is equal to the height of the support column 280, and the diffuser plate 240 can also play a supporting role for the optical film 300, so that the point support of the support columns 280 becomes a surface support, to prevent the display device 10 from forming a dark spot corresponding to the position of the support column 280 during display. Of course, the diffuser plate 240 can also be pasted onto the light plate 210 with an adhesive tape, which is even easier to operate.

A diffusion cavity 243 is provided at a position of the diffuser plate 240 corresponding to the light emitting diode 230 covered by the diffuser plate, and a safety distance is set between the diffusion cavity 243 and the light emitting diode 230. The safety distance is the distance that the light emitting diode 230 will follow the movement of the light plate 210 when the light plate 210 expands and contracts, and a distance greater than this distance is the safety distance. The diffusion cavity 243 is arranged at the position corresponding to the light emitting diode 230 on the diffuser plate 240, so that the diffuser plate 240 and the light plate 210 are closely attached, and the heat generated by the light emitting diode 230 is not directly transmitted to the diffuser plate 240. In addition, a safety distance is set between the inner wall of the diffusion cavity 243 and the light emitting diode 230 to ensure that the diffuser plate 240 and the light emitting diode 230 do not collide and prevent the light emitting diode 230 and the diffuser plate 240 from being damaged.

The most important thing is that the diffuser plate 240 is relatively brittle. Once bumped, it is easy to be damaged. Therefore, it is necessary to reserve a safety distance in advance to prevent the diffuser plate 240 from bumping and damaging the light emitting diode 230. The range of the safety distance is 0.1 mm-0.2 mm, in some embodiments 0.15 mm. That is, the diffusion cavity 243 will not be made too large, and the effect of uniform light will not be reduced, and it is also ensured that the inner wall of the diffusion cavity 243 will not collide with the light emitting diode 230.

Further, the shape of the diffusion cavity 243 is hemispherical. Compared with the solution in which the diffusion cavity 243 is set as a through hole, the hemispherical diffusion cavity 243 has a better light uniformity effect, which can transmit more light from the light emitting diode 230 to the diffuser plate 240, improving the brightness of the diffuser plate 240 as a whole.

The assembled light plate 210 further includes at least two first reflective sheets 271, and the first reflective sheets 271 are disposed on the side walls of the diffuser plate 240 parallel to the gap 220. The light emitted by the light emitting diode 230 covered by the diffuser plate 240 is reflected toward the middle of the diffuser plate to improve the brightness of the diffuser plate 240. Specifically, on the side where the diffuser plate 240 and the light plate 210 are fixed by the support column 280, the first reflective sheet 271 is disposed between the light emitting diode 230 covered by the diffusion sheet 240 and the support column 280 on the light plate 210. The first reflective sheet 271 can be assembled with the diffuser plate 240 by means of adhesive, and the operation is simpler. The first reflective sheet 271 can also be arranged in the diffuser plate 240 by means of arranging a through slot at the corresponding position of the diffuser plate 240. In this way, not applying glue on the reflective surface of the first reflective sheet 271 will not affect the reflectivity of the first reflective surface 271.

In addition, the brightness of the light emitting diodes 230 covered by the diffuser plate 240 can be adjusted. That is, using the local dimming technology, the two rows of light emitting diodes 230 covered by the diffuser plate 240 are separated into local lights. Then, through the local dimming module in the display device, local control is performed on this region in real time, and the brightness of the light emitting diodes 230 covered by the diffuser plate 240 is individually adjusted, so that the light of the entire display panel 600 can be balanced, so that the light of the entire display panel 600 looks more uniform.

The spacing between two adjacent LEDs 230 in a row of LEDs 230 covered by the diffuser plate 240 is smaller than the distance between two adjacent LEDs 230 in a row of LEDs 230 on the light plate 210 that are not covered by the diffuser plate 240. That is, by increasing the density of the light emitting diodes 230 covered by the diffuser plate 240, the brightness of the corresponding position of the diffuser plate 240 is improved.

The reflective surface of the second reflective sheet is attached to the second surface, and the second reflective sheet covers the gap.

The assembled light plate 200 further includes a second reflective sheet 272. The side of the diffuser plate 240 away from the light plate 210 is the first surface 241. The side adjacent to the light plate 210 is the second surface 242. The first surface and the second surface 242 are opposite to each other. The reflective surface of the second reflective sheet 272 is attached to the second surface 241, and the second reflective sheet covers the gap 220.

By attaching the reflective surface of the second reflective sheet 272 to the first surface 241, the light of the diffuser plate 240 corresponding to the gap 220 can be reflected, thereby improving the utilization rate of light. Furthermore, compared with the solution of simply arranging the reflective sheet at the gap 220, the reflective sheet needs to be connected with the two adjacent light plates 210, but cannot cover the light-emitting diodes 230 near the gap 220, so tape m used to stick the reflective sheet onto near the two rows of light emitting diodes 230 near the gap 220 of the two adjacent light plates 210. At this time, the operable position is very small, and the operation is very inconvenient. However, in the present application, the second reflective sheet 272 is attached to the diffuser plate 240, so there is no need to consider the connection between the second reflective sheet 272 and the light plates 210.

Figure 3:
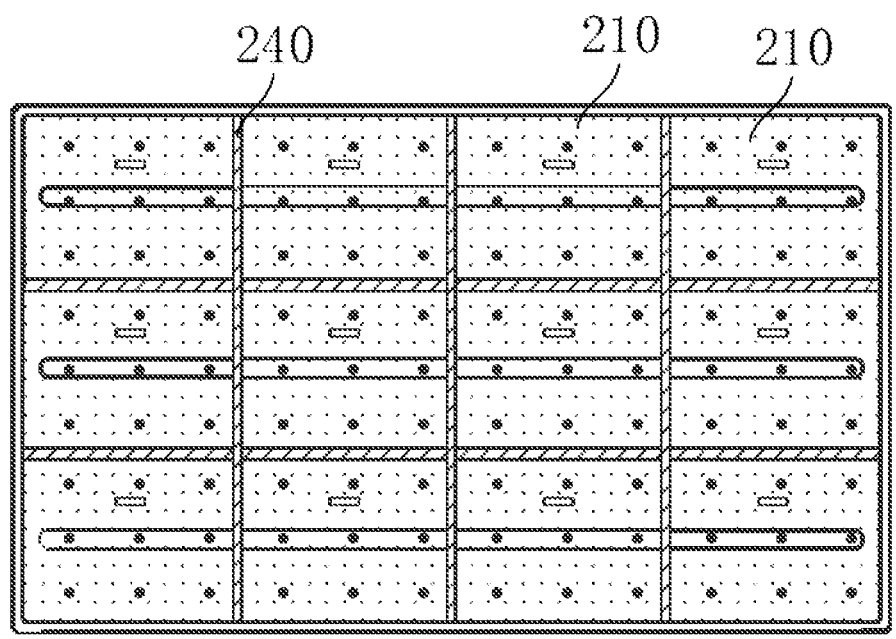
FIG. 3 is a plan schematic diagram of an assembled light plate according to the first embodiment of the present application.

FIG. 3 is a plan schematic diagram of an assembled light plate according to the first embodiment of the present application. As shown in FIG. 3, the assembled light plate 200 is formed by assembling a plurality of light plates 210, and the plurality of diffuser plates 240 at the gaps 220 are integrally formed. Since there may be more than one gap 220 formed by assembling a plurality of light plates 210 of the assembled light plate 200, the diffuser plates 240 at the junctions namely the gaps 220 will be stacked together. By integrally molding all the diffuser plates 240 on the assembled light plate 200, it can not only ensure that the diffuser plates 240 at the junctions namely the gaps 220 do not need to be stacked, and the light at the position will not be too dark, but also facilitate assembly and ensure stable connection between adjacent diffuser plates 240.

The light plate 210 is provided with n columns of light emitting diodes, and the diffuser plate covers the m columns of light emitting diodes on any one of the two adjacent light plates. Or the light plates are provided with n rows of light emitting diodes, and the diffuser plate covers m rows of light emitting diodes on any one of the two adjacent light plates; where $1 \leq m < n/2$.

Figure 4:
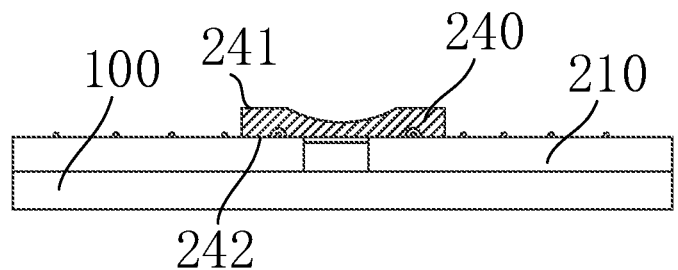
FIG. 4 is a schematic cross-sectional view of a diffuser plate disposed at a gap of a third assembled light plate according to the first embodiment of the present application.

FIG. 4 is a schematic cross-sectional view of a diffuser plate disposed at the gap of a third assembled light plate according to the first embodiment of the present application. As shown in FIG. 4, the side of the diffuser plate 240 away from the light plates 210 is the first surface 241, and the side adjacent to the light plates 210 is the second surface 242. The first surface and the second surface 242 are disposed opposite to each other. The position of the first surface 241 corresponding to the gap 220 is recessed toward the second surface 242 to form an arc shape.

Specifically, when the light is transmitted in the diffuser plate 240, when it is transmitted to the concave arc, the light will be transmitted along the arc toward the center of the arc. The arc center just corresponds to the position of the gap 220, so that the light of the gap 220 is brighter, and the brightness of the gap 220 of the assembled light plate 200 is further improved.

Embodiment 2

Figure 5:
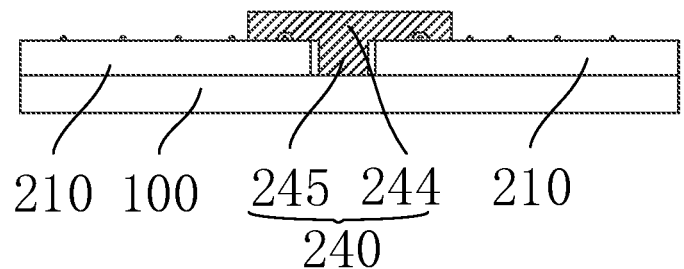
FIG. 5 is a schematic cross-sectional view of a diffuser plate disposed at a gap of an assembled light plate according to the second embodiment of the present application.

FIG. 5 is a schematic cross-sectional view of a diffuser plate disposed at the gap of an assembled light plate according to the second embodiment of the present application. As shown in FIG. 5, as the second embodiment of the present application, different from the first embodiment, a diffuser plate 240 is disclosed that includes a horizontal portion 244 and a vertical portion 245. The horizontal portion 244 is arranged horizontally with the light plates 210. The vertical portion 245 is vertically arranged with respect to the horizontal portion 244. The vertical portion 245 is disposed at the gap 220, one end is connected to the horizontal portion 244, and the other end is fixedly connected to the back plate 100. Furthermore, a safety distance is set between the vertical portion 245 and the light plates 210. The diffuser plate 240 is fixed to the back plate 100 by the vertical portion 245, which can prevent the light plates 210 from colliding with the diffuser plate 240 due to thermal expansion and contraction, preventing the diffuser plate 240 from being damaged.

Embodiment 3

Figure 6:
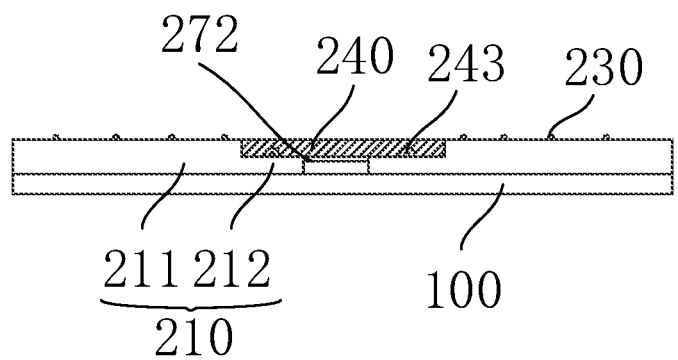
FIG. 6 is a schematic cross-sectional view of a diffuser plate disposed at a gap of an assembled light plate according to the third embodiment of the present application.

FIG. 6 is a schematic cross-sectional view of a diffuser plate disposed at the gap of an assembled light plate according to the third embodiment of the present application. As shown in FIG. 6, as the second embodiment of the present application, which is different from the first embodiment, in that a light plate 210 is disclosed that includes a main body portion 211 and a support portion 212. The support portion 212 is disposed on the side of the main body portion 211 adjacent to the gap 220. The diffuser plate 240 covers the gap 220. The side of the diffuser plate 240 away from the gap 220 is the first surface, and the side adjacent to the gap 220 is the second surface. The first surface abuts with the support portion 212. The second surface is flush with the light-emitting surfaces of the light plates 210. The light emitting diode 230 covered by the diffuser plate 240 is located between the support portion 212 and the diffuser plate 240. The height of the diffuser plate 240 plus the height of the support portion 212 is equal to the height of the main body portion 211.

The support portion 212 is arranged on the light plate 210 to support the diffuser plate 240, and a row of light-emitting diodes 230 on the light plate 210 near the gap 220 is moved to the support portion 212, the surface of the diffuser plate 240 is flush with the light emitting surfaces of the light plates 210, so as to avoid squeezing other structures of the display device 10 due to the excessive thickness of the diffuser plate 240.

Embodiment 4

Figure 7:
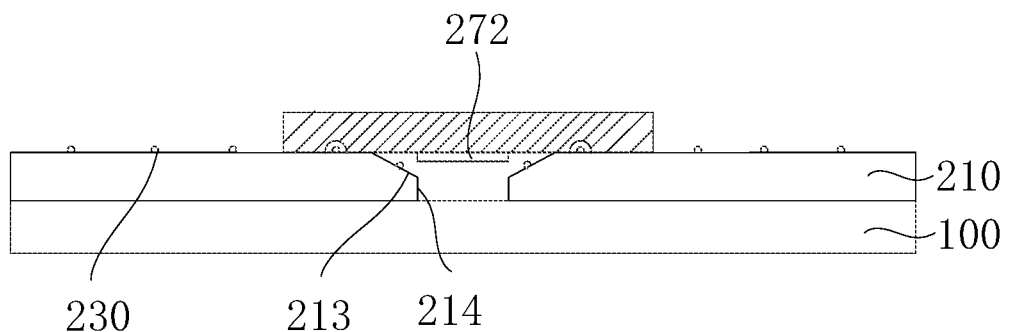
FIG. 7 is a schematic cross-sectional view of a diffuser plate disposed at a gap of an assembled light plate according to a fourth embodiment of the present application.

FIG. 7 is a schematic cross-sectional view of a diffuser plate disposed at the gap of an assembled light plate according to a fourth embodiment of the present application. As shown in FIG. 7, different from the first embodiment, a light plate 210 is disclosed, where a slope 213 and a side wall 214 are disposed on the side of the light plate 210 adjacent to the gap. The upper surface, the slope 213, the side wall 214 of the light plate 210, and the lower surface of the light plate 210 are connected in sequence.

The light-emitting surface of the light plate 210 is the upper surface of the light plate 210. The side of the light plate 210 connected to the back plate, that is, the side away from the light-emitting surface of the light plate 210 is the lower surface of the light plate 210. The side wall 214 is perpendicular to the lower surface of the light plate 210 and the upper surface of the light plate 210. The slope faces the upper side of the gap 220, and the light-emitting surface side of the light plate 210 is the upper side. A reflective paper (not shown) with high reflectivity is provided on the slope to supplement the upper side of the gap 220 with light.

A light emitting diode 230 is disposed on the slope 213, and the upper side of the gap 220 is further supplemented with light. A gap is provided between the second reflective sheet 272 and the slope 213 to avoid collision between the second reflective sheet 272 and the slope 213.

Figure 8:
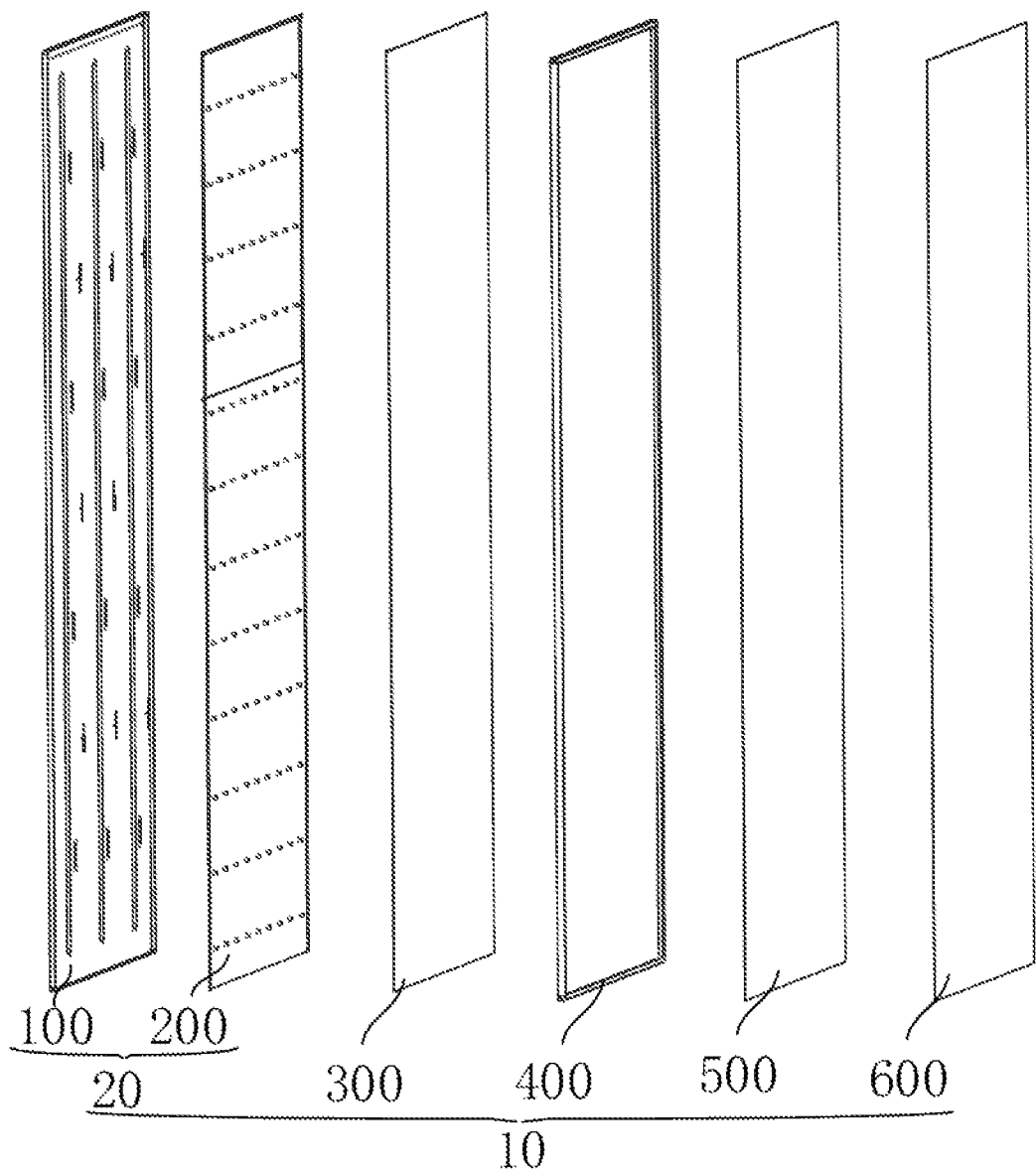
FIG. 8 is an exploded schematic diagram of a display device according to an embodiment of the present application.

FIG. 8 is an exploded schematic diagram of a display device according to an embodiment of the present application. As shown in FIG. 8, a display device 10 is disclosed.

The display device 10 includes a display panel 600 and a backlight module 20. The backlight module 20 is arranged corresponding to the display panel 600. The backlight module 20 provides a backlight source for the display panel 600.

Specifically, the backlight module 20 includes a back plate 100 and an assembled light plate 200. The display device 10 further includes an optical film 300, a sealant frame, and a foam 500. The back plate 100, the assembled light plate 200, the optical film 300, the foam 500, and the display panel 600 are stacked in sequence. The sealant frame 400 is arranged around the edges of the back plate 100, the assembled light plate 200, the optical film 300, the foam 500 and the display panel 600. The display device 10 further includes a local dimming module (not shown) to adjust the local light sources of the assembled light plate 200.

In the assembled light plate 200, a diffuser plate 240 is disposed at the gap 220, and the diffuser plate 240 covers at least one row of light-emitting diodes 230 in at least one of the light plates 210 adjacent to the gap 220, so that the light of the light plate 210 is evenly distributed into the diffuser plate 240, and the light that is evenly distributed is softer. On the basis of supplementing light at the gap 220, the light transition between the gap 220 and the light plates 210 is more uniform. Furthermore, the manufacturing cost of the diffuser plate 240 is lower, the production cost is saved, and the display effect of the display device 10 is improved.

It should be noted that the inventive concept of the present application can form a large number of embodiments, but they cannot be enumerated because the length of the application document is limited. The technical features as set forth herein can be arbitrarily combined to form a new embodiment, and the original technical effects may be enhanced after various embodiments or technical features are combined.

The foregoing is a further detailed description of the present application in conjunction with specific optional embodiments, but it should not be construed as that the specific implementation of the present application will be limited to these descriptions. For those having ordinary skill in the technical field of the present application, without departing from the scope and spirit of the present application, some simple deductions or substitutions can be made, which should all be regarded as falling in the scope of protection of the present application.

What is claimed is:

1. A backlight module, comprising an assembled light plate, the assembled light plate being formed by assembling a plurality of light plates, wherein there is a gap between every two adjacent light plates;
wherein the backlight module further comprises a diffuser plate arranged at a position corresponding to the gap, wherein the diffuser plate covers at least one row of light-emitting diodes from an array of light-emitting diodes disposed on at least one of the two adjacent light plates, and wherein at least part of the light-emitting diodes on each light plate is not covered.

2. The backlight module of claim 1, wherein the diffuser plate simultaneously covers one row of light emitting diodes that are disposed on each of the two light plates on both sides of the gap and that are adjacent to the gap.

3. The backlight module of claim 1, wherein a diffusion cavity is disposed in the diffuser plate at a position corresponding to the respective light emitting diode covered by the diffuser plate, and a safety distance is set between an inner wall of the diffusion cavity and the respective light emitting diode.

4. The backlight module of claim 3, wherein the diffusion cavity has a hemispherical shape.

5. The backlight module of claim 3, wherein the assembled light plate further comprises at least two first reflective sheets, which are each arranged on a side wall of the respective diffuser plate parallel to the gap.

6. The backlight module of claim 3, wherein a distance between two adjacent light-emitting diodes in each row of light-emitting diodes covered by the diffuser plate is smaller than a distance between two adjacent light-emitting diodes in each row of light-emitting diodes on the light plate that are not covered by the diffuser plate.

7. The backlight module of claim 1, wherein a side of the diffuser plate away from the respective light plates is a first surface, and a side adjacent to the light plates is a second surface, wherein the first surface and the second surface are disposed opposite to each other, and wherein a portion of the first surface corresponding to the position of the gap is recessed toward the second surface to form an arc shape;
wherein the safety distance lies in the range of 0.1 mm-0.2 mm.

8. The backlight module of claim 1, wherein the assembled light plate further comprises a second reflective sheet, wherein a side of the diffuser plate away from the respective light plates is a first surface, and a side of the diffuser plate adjacent to the respective light plates is a second surface, wherein the first surface and the second surface are disposed opposite to each other, and wherein a reflective surface of the second reflective sheet is attached to the second surface, and the second reflective sheet covers the gap.

9. The backlight module of claim 1, wherein each light plate comprises a main body portion and a support portion, wherein the support portion is arranged on a side of the main body portion adjacent to the gap;
wherein the diffuser plate covers the gap, wherein a side of the diffuser plate away from the gap is a first surface, and a side of the diffuser plate adjacent to the gap is a second surface, wherein the first surface abuts with the support portion, wherein the second surface is flush with light-emitting surfaces of the respective light plates, wherein the light emitting diodes covered by the diffuser plate are located between the support portion and the diffuser plate.

10. The backlight module of claim 1, wherein the diffuser plate is fixedly connected to one of the two adjacent light plates, and is movably connected to the other one of the two adjacent light plates.

11. The backlight module of claim 10, wherein a through hole is defined in the diffuser plate, and a support column disposed on the light plate is fixedly connected to the through hole.

12. The backlight module of claim 11, wherein a thickness of the diffuser plate is equal to a height of the support column.

13. The backlight module of claim 1, wherein a brightness of the at least one row of light emitting diodes covered by the diffuser plate is adjustable.

14. The backlight module of claim 1, wherein a plurality of the diffuser plates at the gaps are integrally formed.

15. The backlight module of claim 1, wherein a number of n columns of light-emitting diodes are arranged on each light plate, and the diffuser plate a number of m columns of light emitting diodes on any one of the two adjacent light plates; or a number of n rows of light emitting diodes are arranged on each light plate, and the diffuser plate covers a number of m rows of light emitting diodes on any one of the two adjacent light plates; where $1 \leq m < n/2$.

16. The backlight module of claim 1, wherein the diffuser plate comprises a horizontal portion and a vertical portion, wherein the horizontal portion is disposed parallel to the light panel, and the vertical portion is disposed perpendicular to the horizontal portion; wherein the vertical portion is arranged at the gap, one end of the vertical portion is connected to the horizontal portion, and the other end of the vertical portion is fixedly connected to the back plate.

17. The backlight module of claim 1, wherein a slope and a side wall are disposed on the side of the light plate adjacent to the gap, wherein the light-emitting surface of the light plate is an upper surface of the light plate, and wherein the upper surface, the slope, the side wall of the light plate, and the lower surface of the light plate are connected in sequence.

18. The backlight module of claim 17, wherein a light emitting diode is disposed on the slope.

19. A backlight module, comprising an assembled light plate, the assembled light plate being formed by assembling a plurality of light plates, wherein there is a gap between every two adjacent light plates; wherein the backlight module further comprises a diffuser plate arranged at a position corresponding to the gap, wherein the diffuser plate covers at least one row of light-emitting diodes from an array of light-emitting diodes disposed on at least one of the two adjacent light plates, and wherein at least part of the light-emitting diodes on each light plate is not covered;
wherein the diffuser plate simultaneously covers one row of light-emitting diodes that are disposed on each of the two light plates on both sides of the gap and that are adjacent to the gap;
wherein a diffusion cavity is disposed in the diffuser plate at a position corresponding to the respective light emitting diode covered by the diffuser plate, and a safety distance is set between an inner wall of the diffusion cavity and the respective light emitting diode;
wherein the diffusion cavity has a hemispherical shape;
wherein the assembled light plate further comprises at least two first reflective sheets, which are each arranged on a side wall of the respective diffuser plate parallel to the gap;
wherein a distance between two adjacent light-emitting diodes in each row of light-emitting diodes covered by the diffuser plate is smaller than a distance between two adjacent light-emitting diodes in each row of light-emitting diodes on the light plate that are not covered by the diffuser plate;
wherein a side of the diffuser plate away from the respective light plates is a first surface, and a side adjacent to the light plates is a second surface, wherein the first surface and the second surface are disposed opposite to each other, and wherein a portion of the first surface corresponding to the position of the gap is recessed toward the second surface to form an arc shape;
wherein each light plate comprises a main body portion and a support portion, wherein the support portion is arranged on a side of the main body portion adjacent to the gap;
wherein the assembled light plate further comprises a second reflective sheet, and wherein the second reflective sheet covers the gap;
wherein the diffuser plate covers the gap, wherein a side of the diffuser plate away from the gap is a first surface, and a side of the diffuser plate adjacent to the gap is a second surface, wherein the first surface abuts with the support portion, wherein the second surface is flush with light-emitting surfaces of the respective light plates, wherein the light emitting diodes covered by the diffuser plate are located between the support portion and the diffuser plate.

20. A display device, comprising a display panel and a backlight module, wherein the backlight module is arranged corresponding to the display panel, and the backlight module is configured to provide a backlight source for the display panel; wherein the backlight module comprises an assembled light plate, the assembled light plate being formed by assembling a plurality of light plates, wherein there is a gap between every two adjacent light plates;

wherein the backlight module further comprises a diffuser plate arranged at a position corresponding to the gap, wherein the diffuser plate covers at least one row of light-emitting diodes from an array of light-emitting diodes disposed on at least one of the two adjacent light plates, and wherein at least part of the light-emitting diodes on each light plate is not covered.

* * * * *